US006463374B1

(12) United States Patent
Keller et al.

(10) Patent No.: US 6,463,374 B1
(45) Date of Patent: *Oct. 8, 2002

(54) FORM LINE FOLLOWING GUIDANCE SYSTEM

(75) Inventors: Russell J. Keller, Sunnyvale, CA (US); Robert W. Petrie; Gregory R. Price, both of Christchurch (NZ)

(73) Assignee: Trimble Navigation Ltd., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,801

(22) Filed: Jun. 3, 1999

Related U.S. Application Data

(63) Continuation of application No. 08/847,935, filed on Apr. 28, 1997, now Pat. No. 5,987,383.

(51) Int. Cl.[7] .............................. G06F 7/70; G06G 7/76
(52) U.S. Cl. .................... 701/50; 701/213; 342/357.06; 342/357.11; 111/200
(58) Field of Search .......................... 701/50, 213, 214, 701/200, 207, 208; 342/357.08, 357.11, 357.17, 64, 46, 126, 357.06; 239/1, 11, 155, 67, 170; 172/4, 4.5; 700/2, 9; 56/10.2 A, 10.2 F, DIG. 5, DIG. 10, DIG. 15; 111/915, 200

(56) References Cited

U.S. PATENT DOCUMENTS

| | | | |
|---|---|---|---|
| 4,398,195 A | 8/1983 | Dano ........................... | 342/46 |
| 4,630,773 A | 12/1986 | Ortlip ............................. | 239/1 |
| 4,847,773 A | 7/1989 | Van Helsdingen et al. . | 701/200 |
| 4,881,080 A | 11/1989 | Jablonski ............... | 342/357.08 |
| 4,939,663 A | 7/1990 | Baird .......................... | 701/208 |

(List continued on next page.)

OTHER PUBLICATIONS

C.S. Parkin and B.S. Blackmore, "a Precision Farming Approach To the Application of Agrochemicals" (Adress, http://www.cranfield.ac.uk/safe/cpf/default.htm,Down loaded on Wednesday, Feb. 26, 1997).

(List continued on next page.)

Primary Examiner—Jacques Louis
(74) Attorney, Agent, or Firm—Blakely Sokoloff Taylor & Zafman LLP

(57) ABSTRACT

A first form line is defined using two or more terrestrial locations. The first form line may be predefined or may be defined by user during a spraying operation. A second form line is then computed using positioning data obtained while following the first form line and a swathing offset corresponding to the width of a spray pattern. The second form line is updated according to one or more deviations from the computed path. The deviations may correspond to operator inputted corrections which allow for obstacle avoidance, etc. The updating generally occurs by following the second form line as defined by the positioning data and the swathing offset and then deviating from the second form line to accommodate one or more terrain features. New GPS data is collected during these steps of following and deviating from the second form line and new positions are computed from the new GPS data. Finally, the updated second form line is defined using the new positions computed from the new GPS data. A further form line may then be defined using the updated second form line information and the swathing offset. A form line following apparatus may include a vehicle fitted with a GPS receiver configured to-receive GPS data and GPS correction information and to compute form line following information therefrom. The form line following apparatus may also include a display device configured to receive and display the, form line following information.

9 Claims, 10 Drawing Sheets

U.S. PATENT DOCUMENTS

| | | | |
|---|---|---|---|
| 4,967,362 A | | 10/1990 | Schutten et al. ............... 701/50 |
| 5,204,814 A | | 4/1993 | Noonan et al. ................ 701/25 |
| 5,268,695 A | | 12/1993 | Dentinger et al. ...... 342/357.11 |
| 5,334,987 A | | 8/1994 | Teach ..................... 342/357.17 |
| 5,438,817 A | * | 8/1995 | Nakamura ................ 56/10.2 A |
| 5,483,456 A | * | 1/1996 | Kuwahara et al. .......... 701/213 |
| 5,606,850 A | * | 3/1997 | Nakamura ................ 56/10.2 A |
| 5,631,658 A | * | 5/1997 | Gudat et al. ................. 342/457 |
| 5,646,846 A | * | 7/1997 | Bruce et al. ................... 701/50 |
| 5,653,389 A | * | 8/1997 | Henderson et al. ............ 239/69 |
| 5,704,546 A | * | 1/1998 | Henderson et al. ............. 239/1 |
| 5,772,114 A | * | 6/1998 | Hunter ......................... 239/67 |
| 5,928,309 A | * | 7/1999 | Korver et al. ............... 701/214 |
| 5,931,882 A | * | 8/1999 | Fick et al. .................... 701/50 |
| 5,978,723 A | * | 11/1999 | Hale et al. .................... 701/50 |
| 6,047,227 A | * | 4/2000 | Henderson et al. ........... 701/50 |

OTHER PUBLICATIONS

Raymond C. Daigh, "High Reliability Navigation for Autonomous Vehicles" *Trimble Navigation Conference Proceedings*, pp. 133–143, (1996).

Trimble Commercial Systems Group, "TrimFlight GPS Technical Overview" *Application& Technical Notes*, pp.1–8. Feb., 1996).

Trimble Navigation Limited, "FieldGuide Precise Agricultural DGPS System" *Product Information Sheet*, pp. 1–2 (11/96).

* cited by examiner

FORM LINE FOLLOWING GUIDANCE SYSTEM

This application is a continuation of Ser. No. 08/847,935 filed Apr. 28, 1997 now U.S. Pat. No. 5,987,383.

FIELD OF THE INVENTION

The present invention relates to precision farming methodologies and, in particular, such methodologies as employ global positioning system (GPS) technologies.

BACKGROUND

In modern agricultural industries, accuracy is essential. Accurate record keeping, automated mapping, and precision farming techniques have all become crucial factors in the challenge to improve overall crops yields and comply with the ever increasing number of environmental regulations. The accurate application of herbicides, pesticides and fertilizers is an essential component of modern precision farming methodologies. Whether such applications are performed by aerial or terrestrial techniques, advanced tools that provide highly accurate navigation and guidance information for operators have become a requirement.

The transfer of global positioning'system (GPS) technologies to civilian industry has greatly assisted in meeting the challenges presented by today's precision agricultural needs. Using GPS systems, accurate and highly reliable satellite-based positioning information, which typically achieves less than one meter accuracy by utilizing differential GPS position corrections transmitted from fixed base stations, is provided to operators, for example though moving map displays. Such information allows for precise navigation and guidance. Systems utilizing GPS technology have been used in the past to assist in the aerial and terrestrial application of fertilizers, herbicides and pesticides, etc. However, such systems have generally been limited in their capabilities.

For example, as shown in FIG. 1A, GPS guidance systems which allow operators to follow essentially parallel line spraying routes across a field have been used. For given field, an operator in a sprayer rig 10 may begin a spraying pattern along an initial line 12. At the end of the field, or at some point prior to the end of the field, the operator generally maneuvers the sprayer rig 10 onto a return path 14. The return path 14 is essentially parallel to the initial path 12 and is separated from the initial path 12 by distance corresponding to the width of the spray pattern. An alternative spraying pattern is shown in FIG. 1B. This spraying pattern resembles a race track pattern and again provides essentially parallel line spraying patterns.

Spraying patterns such as those shown in FIGS. 1A and 1B are useful for aerial applications and for terrestrial applications involving row crops. However, such spraying patterns are not well suited for terrestrial spraying applications involving open field crops, for example, wheat, barley, etc. Typically, such crops are grown over terrain of varying contours and often in fields which present obstacles to straight line spraying patterns. What is needed, therefore, is a precision farming guidance and/or control system for terrestrial spraying applications which may be used in an open field crop environment.

SUMMARY OF THE INVENTION

In one embodiment, the present invention provides a method of form line following. A first form line is defined using two or more terrestrial locations. The first form line may be predefined or may be defined by user during spraying operations. A second form line is then computed using positioning data obtained while following the first form line and a swathing offset corresponding to the width of a spray pattern. The second form line is updated according to one or more deviations from its computed path.

The deviations may correspond to operator inputted corrections which allow for obstacle avoidance, etc. The updating generally occurs as users follow the second form line as defined by the positioning data and the swathing offset and then deviate from the second form line to accommodate one or more terrain features. New GPS data is collected during these steps of following and deviating from the second form line (as computed) and new positions are computed from the new GPS data. Finally, the updated second form line is redefined using the new positions computed from the new GPS data and a further form line may then be defined using the updated second form line information and the swathing offset.

In an alternative embodiment, the present invention provides a form line following apparatus which includes a vehicle fitted with a GPS receiver configured to receive GPS data and GPS correction information and to compute position information therefrom. A processor configured to receive the position information and to compute form line following information therefrom is also provided. The processor may be part of the GPS receiver or it may be a separate unit. The processor is also configured to update the form line following information in response to form line deviation information. The form line deviation information may come, for example, from operator inputted corrections to accommodate various terrain features. The form line following apparatus may also include a display device configured to receive and display the form line following information. The display device may include a moving map display and/or a light bar display which allow an operator to follow a computed form line path.

Other features and advantages of the present invention will be recognized upon review of the following detailed description wherein reference is made to the accompanying drawings.

BRIEF DESCRIPTION OF THE DRAWINGS

The present invention is illustrated by way of example, and not limitation, in the figures of the accompanying drawings in which.

DETAILED DESCRIPTION

Figure 1A:
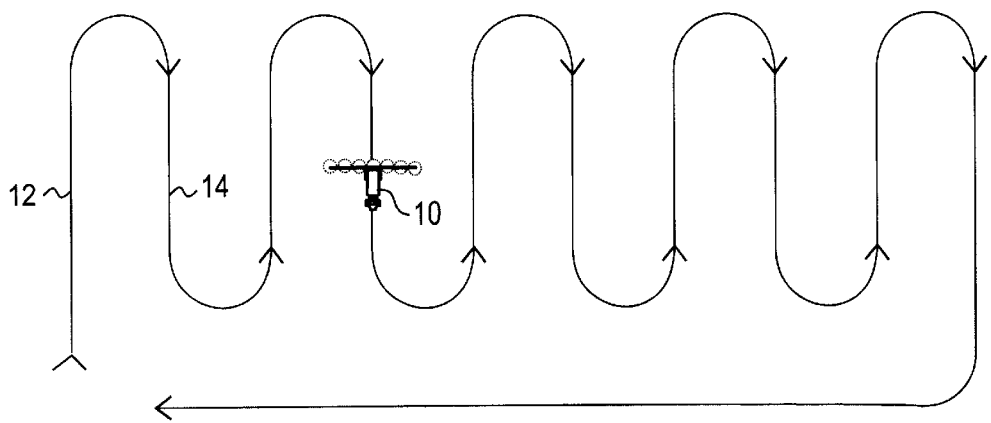
FIGS. 1A and 1B illustrate spraying guidance patterns provided by GPS systems of the prior art.
Figure 1B:
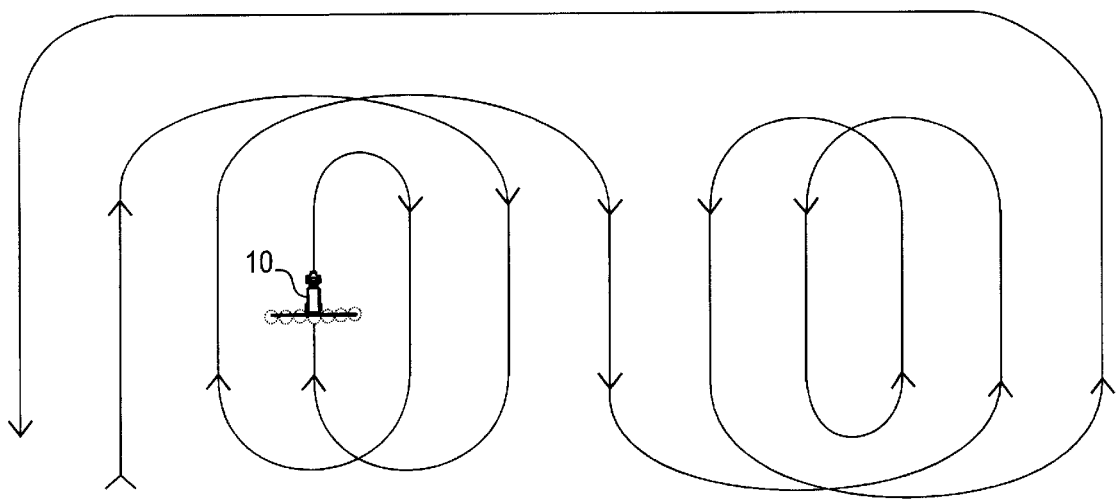

A form line following guidance system is described. The system may find application in crop spraying operations or in other situations (e.g., harvesting, ploughing, planting, mining, mineral prospecting, or other applications) where real-time correction information must be applied to previously computed guidance paths. In one embodiment, a method of form line following includes defining a first form line using two or more terrestrial locations. A second form line is defined using the positioning data and a swathing offset. In general, the swathing offset corresponds to the width of a spraying pattern (i.e., a boom width). In other cases, the swathing offset takes into account varying elevations which may be encountered, for example, when applying fertilizers, etc. over a field which includes a hillside or other sloping terrain. The second form line is followed and updated according to one or more deviations. The deviations may correspond to user inputted corrections to accommodate one or more terrain features encountered during the spraying operations. GPS data may be collected during the steps of following and deviating from the computed second form line path and one or more positions computed therefrom. An updated second form line may than be defined using the computed positions.

In an alternative embodiment, a form line following apparatus includes a vehicle fitted with a GPS receiver configured to receive GPS data and GPS correction information and to compute position information therefrom. A processor (which may be part of the GPS receiver or a separate unit) is configured to receive the position information and to compute form line following information therefrom and is further configured to update the form line following information in response to form line deviation information. Although the present invention is described with reference to these and other exemplary embodiments, upon review of this detailed description and the accompanying illustrations it will be apparent to those skilled in the art that the present invention is equally applicable for use in a variety of other guidance systems which accept operator inputted real-time corrections. Accordingly, the embodiments described below should be regarded as illustrative only.

Although the methods and apparatus of the present invention will be described with reference to GPS satellites, it will be appreciated that the teachings are equally applicable to systems which utilize pseudolites or a combination of satellites and pseudolites. Pseudolites are ground based transmitters which broadcast a PRN code (similar to a GPS signal) modulated on an L-band (or other frequency) carrier signal, generally synchronized with GPS time. Each transmitter may be assigned a unique PRN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

It will be further appreciated that the methods and apparatus of the present invention are equally applicable for use with the GLONASS and other satellite-based positioning systems. The GLONASS system differs from the GPS system in that the emissions from different satellites are differentiated from one another by utilizing slightly different carrier frequencies, rather than utilizing different pseudo-random codes. As used herein and in the claims which follow, the term GPS should be read as indicating the United States Global Positioning System as well as the GLONASS system and other satellite- and/or pseudolite-based positioning systems.

In addition, the form line following guidance system described herein may be supplemented with non-satellite based guidance systems and methodologies, such as inertial navigation systems, distance and gyro compass and/or other heading indicator systems, laser range finding and bearing indicator systems, etc. The use of such systems to assist in terrestrial navigation is well known in the art and will not be described further so as not to unnecessarily obscure the present invention. It should be recognized that such systems could supplement the GPS-based system described in detail below and would be particularly useful, for example, in situations where satellite-based positioning signals are unavailable (e.g., under foliage, behind hills or buildings, in valleys, mines, etc.).

Figure 2:
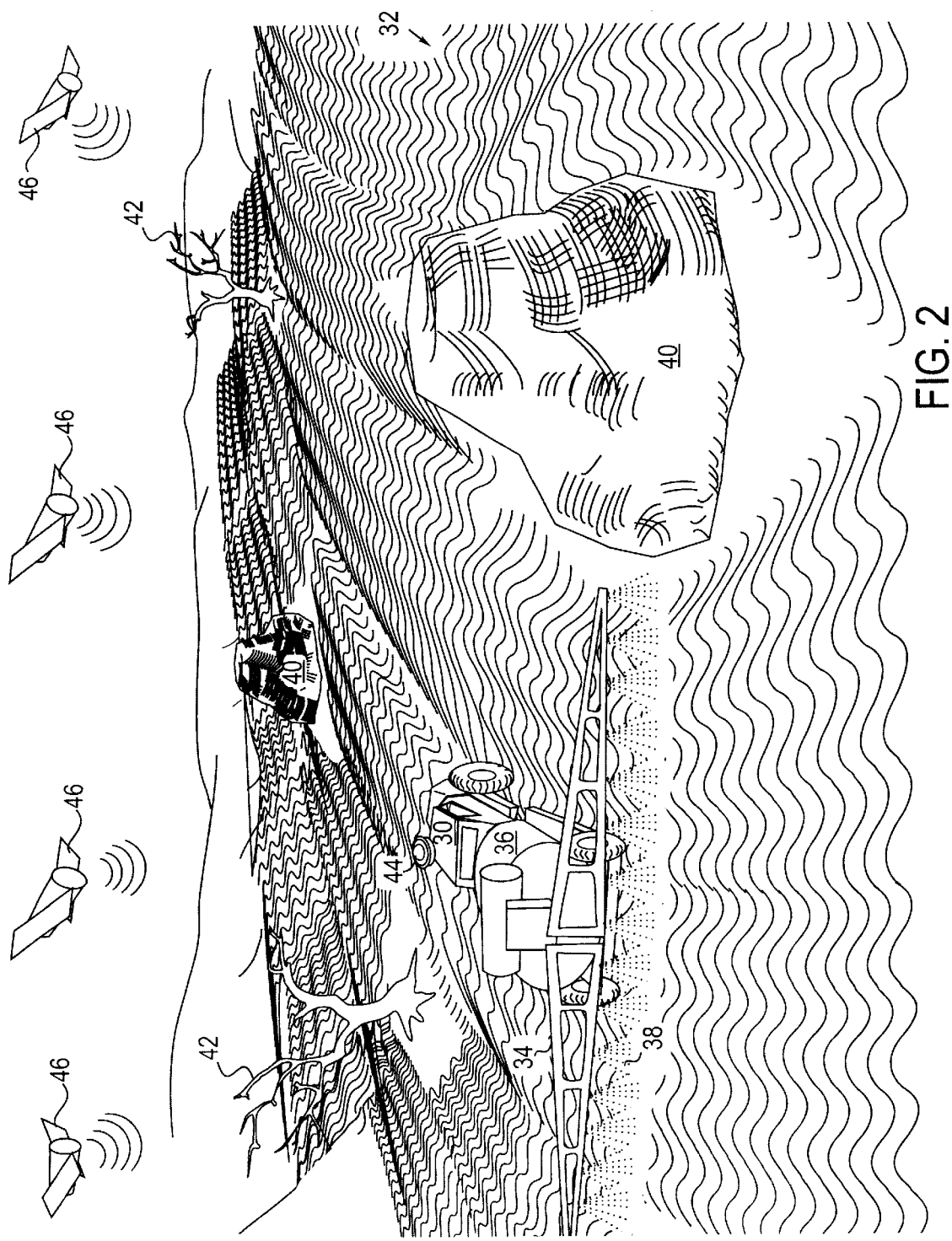
FIG. 2 illustrates a spraying rig operating in an open field crop environment in accordance with the present invention.

FIG. 2 illustrates a sprayer rig 30 operating in an agricultural field (or other plot of land) 32. Sprayer (or floater) rig 30 is equipped with a boom 34 which allows delivery of a variety of crop protection products, conventional chemicals and/or liquid fertilizers. Examples of the crop protection products may include herbicides, pesticides, etc. The crop protection products or other chemicals or fertilizers are generally stored in a tank assembly 36 and are delivered through nozzles 38 which are present in boom assembly 34. Various controls in the cab of sprayer rig 30 allow an operator to control the flow of chemicals in tank assembly 36 through boom 34 and nozzles 38, thus allowing the operator to apply such chemicals where needed.

Field 32 may be any one of a number of growing fields. Preferably, field 32 is an open field, i.e., not one configured for row crops. As such, field 32 may include growing crops such as wheat, barley, etc. As shown, field 32 has various contours and may be defined by irregular boundary lines.

Field 32 also includes a number of terrain features or obstacles such as rocks or boulders 40 and trees 42. Other obstacles such as ponds, streams, buildings, roads, etc. (not shown) may also be present. During spraying operations, sprayer rig 30 must avoid these obstacles and yet still deliver the crop protection products and/or other chemicals where needed. To accomplish this task, sprayer rig 30 is fitted with a GPS antenna 44 which receives GPS data from one or more GPS satellites 46. Sprayer rig 30 will also include a GPS receiver capable of interpreting the GPS data received through antenna 44 so as to provide guidance information. The guidance system employed by sprayer rig 30 is unlike the guidance systems of the prior art because, as those skilled in the art will appreciate, the parallel line guidance patterns available from the guidance systems of the prior art are unsuitable for use in field 32 where obstacles such as rocks 40 and trees 42 prevent sprayer rig 30 from following precise parallel line swathing (or spraying) patterns.

Figure 3:
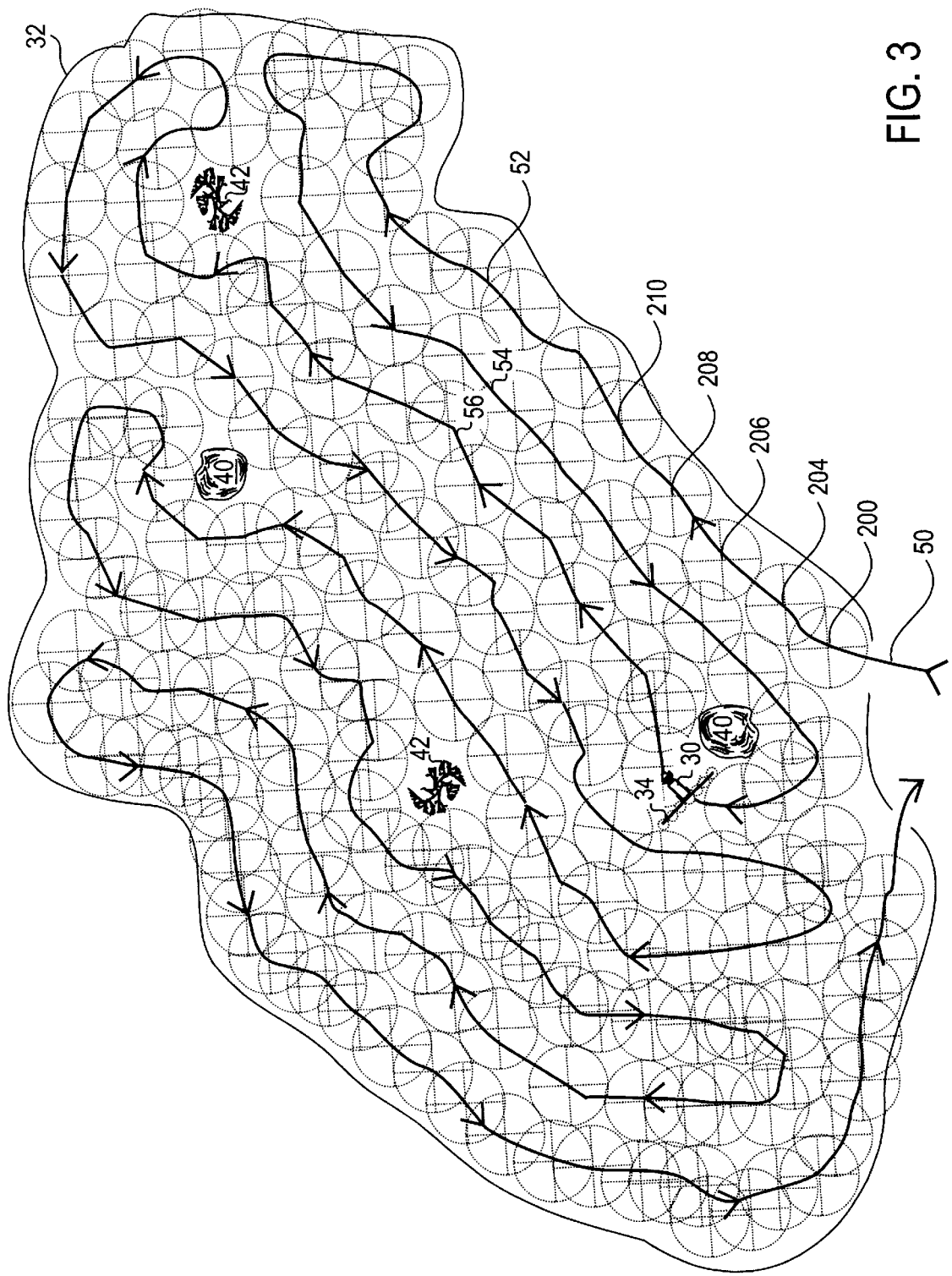
FIG. 3 further illustrates the spraying rig operating in the open field crop environment in accordance with the present invention.

FIG. 3 illustrates an overhead view of field 32. Sprayer rig 30 is shown in proximity to a rock 40 within field 32. As shown by the guidance path information presented as guidance path 50, sprayer rig 30 must follow a spraying path through field 32 which accommodates not only the contours of the field but also the various terrain features and obstacles presented therein. For example, sprayer rig 30 must avoid the rocks 40 and trees 42 and yet still follow a path 50 which allows for precise application of the various chemicals through boom assembly 34. The various form lines 52, 54, 56, etc. of guidance path 50 are separated by approximately the effective spraying width of boom assembly 34. The offset is sometimes referred to as a swathing offset and ensures that all areas of field 32 are adequately (but not overly) covered by the spraying assembly as the chemicals are being applied.

Notice that guidance path 50 will be such as to accommodate operator inputted corrections for deviations around obstacles such as rocks 40 and trees 42. That is, after the first form line 52 is traversed by sprayer rig 30, a return path (form line 54) is computed which allows for an offset by approximately the width boom assembly 34. However, at various points along form line 54, operator inputted corrections, such as those required to deviate around rock 40, will be input (e.g., through a steering wheel). Thus, when computing the next form line (form line 56), these operator inputted deviations must be accounted for. The manner in which this is accomplished by the present invention is described below.

Figure 4:
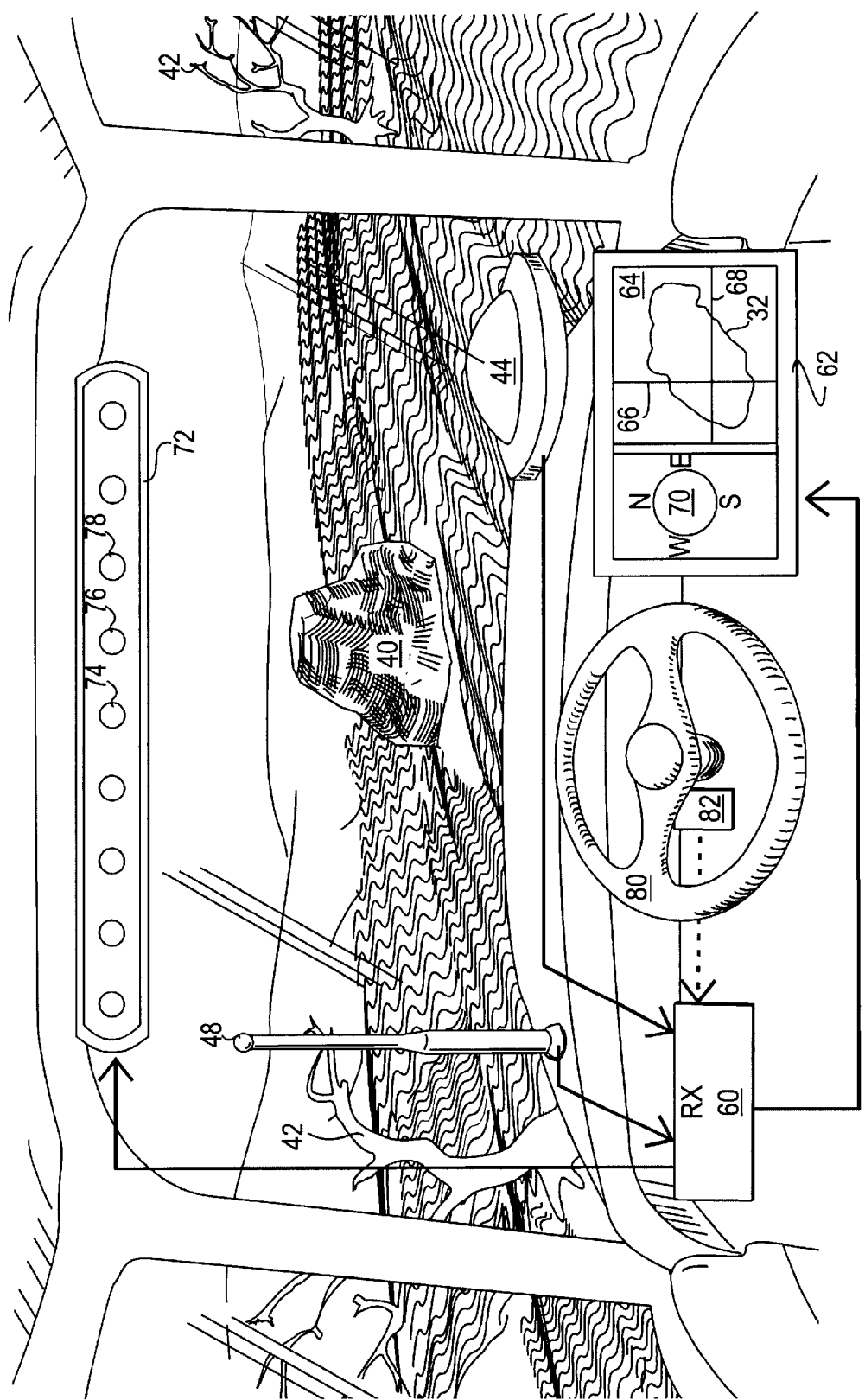
FIG. 4 illustrates a form line following apparatus according to one embodiment of the present invention.

FIG. 4 illustrates the basic features of a form line following apparatus according to one embodiment of the present invention. FIG. 4 is drawn from the stand point of an operator console within sprayer rig 30. However, it will be appreciated that other embodiments with varying configurations may also be used.

The form line following apparatus includes a GPS antenna 44 which is mounted on sprayer rig 30 so as to have a clear view of the sky. This will ensure that antenna 44 is capable of capturing signals from GPS satellites 46. Signals from antenna 44 are provided to GPS receiver 60 which may be mounted inside the cab of sprayer rig 30 or at another convenient location on the vehicle. Receiver 60 may also receive differential GPS correction information through antenna 48 from one of a variety of sources. For example, such differential GPS (DGPS) correction information may be provided by radio telemetry from a GPS base station situated near field 32 as is common in the GPS arts. Alternatively, GPS receiver 60 may receive differential GPS correction information from FM subcarrier broadcasts or from other sources (e.g., satellite transmissions as are currently available from the John Chance Co. in the US or Racal in the UK). GPS receiver 60 uses the GPS data provided through antenna 44 from the GPS satellites 46 and the differential GPS information received through antenna 48 to compute position information for sprayer rig 30. The position information corresponds to the terrestrial location of sprayer rig 30 at the time the GPS data is collected. Such position computations may occur periodically, for example, several times each second. Using differential GPS correction techniques common in the art, submeter position accuracy may be obtained. In an alternative embodiment, GPS receiver 60 may be configured to operate with real-time kinematic (RTK) corrections which provide centimeter level accuracy. In general, however, submeter accuracy is sufficient for most precision farming applications.

The position information computed by GPS receiver 60 is processed and provided to display device 62. Display device 62 may include a moving map display 64 which allows an operator to determine the precise location of sprayer rig 30 with respect to the boundaries of field 32. As illustrated, field 32 has some irregular boundaries and the intersection of cross-hairs 66 and 68 define the position of sprayer rig 30 within field 32. The process for generating such moving map display information is well known in the art and need not be described further. Also included on display device 62 may be a compass rose or heading indicator 70. Heading indicator 70 generally indicates the direction that sprayer rig 30 is traveling. Through the use of moving map display 64 and heading indicator 70, an operator is provided with simple and effective information to control spraying operations within field 32.

Also included as part of the form line following apparatus is a multi-function light bar 72. The multi-function light bar 72 receives guidance information from GPS receiver 60 and provides clear and immediate guidance information/commands to an operator of sprayer rig 30 through a row of light emitting diodes (LEDs). These LEDs are used to alert an operator when sprayer rig 30 has deviated from a computed form line path. The sensitively of light bar 72 (i.e., the deviation required before an LED will be illuminated to indicate that sprayer rig 30 is straying from the computed path) may be operator configured for various types of spraying operations and field conditions. In addition, the light bar 72 may have a text screen (not shown) to display user selected information such as the form line number, sprayer rig speed, flow rate, etc. In other embodiments, multi-function light bar 72 may be replaced by a liquid crystal or other display device configured to provide similar course guidance and/or correction information.

During spraying operations, LED 74 will be lit when sprayer rig 30 is following a computed form line path as described below. As sprayer rig 30 deviates from the computed form line path, offset indicator LEDs 76, 78, etc. will be lit to indicate the degree (or distance) of deviation from the computed path. Note that LEDs 76, 78, etc. will be lit if sprayer rig 30 deviates to the right of the computed path and corresponding LEDs on the other side of LED 74 will be lit if sprayer rig 30 deviates to the left of the computed path. Alternatively, LEDs 76, 78, etc. may be lit to indicate that sprayer rig 30 should be steered to the right to get back to a computed form line path, etc. The times at which the LEDs will be lit may be user configured. For example, LED 76 may be lit when sprayer rig 30 has deviated by two to three feet from the computed form line. Then, if sprayer rig 30 continues to deviate, for example to five feet from the computed form line path, LED 78 may be lit In other situations, LED 76 may not be lit until a five foot deviation has been recognized. In this way, the user is provided with information which allows him or her to correct the path of sprayer rig 30 back to that of the computed form line.

Operator corrections and steering controls are input through steering wheel 80. The form line following apparatus may be included with a steering input option which allows steering commands to be transmitted from a steering apparatus 82 to GPS receiver 60. Steering apparatus 82 provides information regarding the steering inputs through steering wheel 80 so that GPS receiver 60 can be provided with real-time update information (e.g., the above-described deviations). Using the various steering commands provided through steering input apparatus 82, GPS receiver 60 can provide appropriate display information to display device 62 and light bar 72. In other embodiments, other heading sensors such as a gyro compass or flux-gate gyro compass may provide the update information to GPS receiver 60. For the case where no steering information is used, the form line following apparatus may rely on updated position information derived from GPS data received from satellites 46 to compute and provide the display information.

Figure 5:
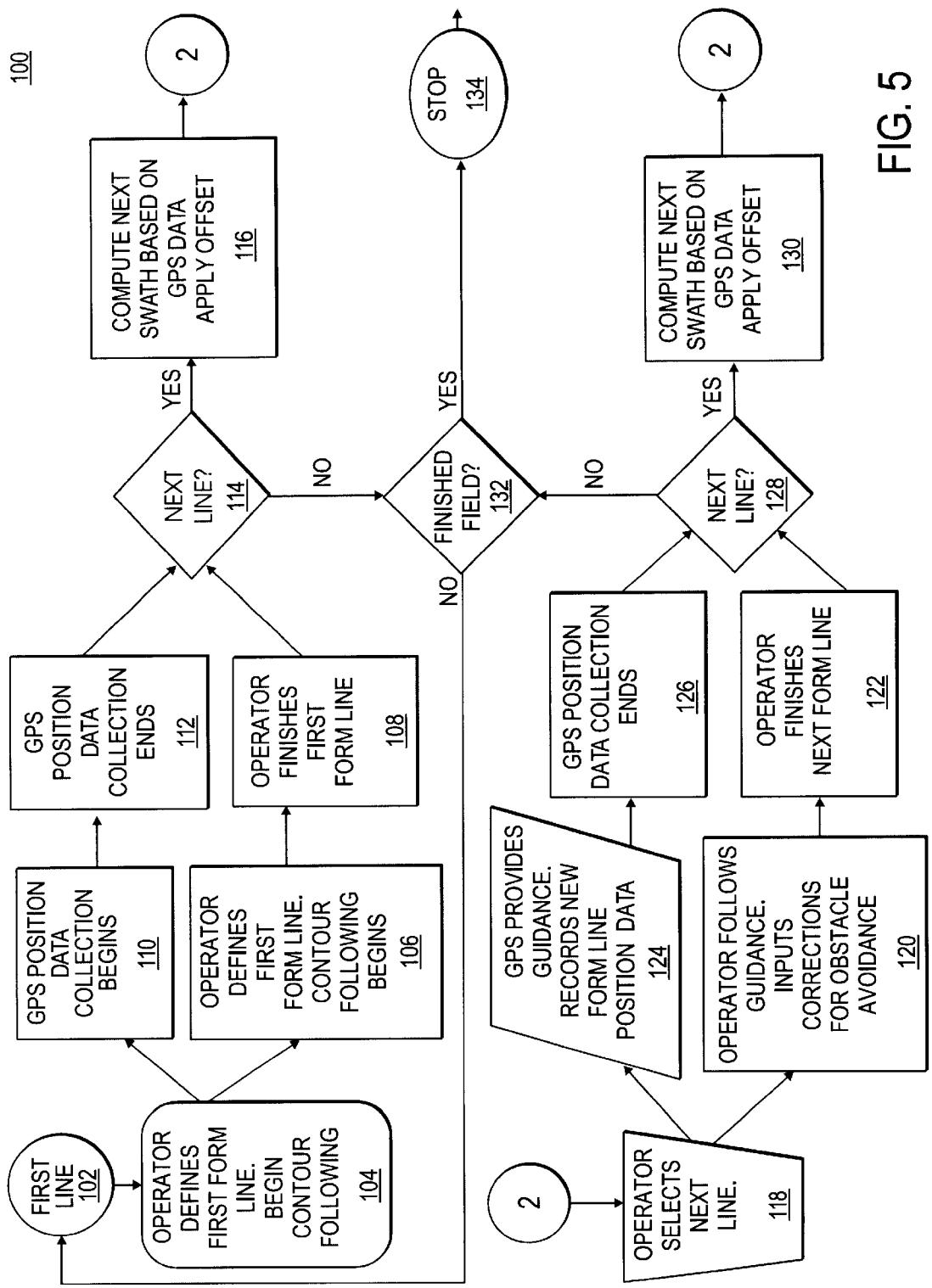
FIGS. 5 illustrate a form line following process in accordance with one embodiment of the present invention.

FIG. 5 illustrates a general computation scheme which may be utilized by GPS receiver 60 (or a separate processor) in accordance with the present invention. Form line following process 100 starts at step 102 when an operator begins the first form line. From step 102 the process moves to step 104 where an operator defines the first form line. This may be done as sprayer rig 30 is driven across field 32 using the form line following apparatus, including GPS receiver 60, to collect and store position information or by down loading a previously computed form line map from another source. Such a map may be obtained from a geographical information structure (GIS) which also contains information on other aspects of field 32 as described further below. Alternatively, the information may be provided from a stored map, such as may be generated by digitizing an aerial photograph of field 32. In general, however, the operator will define the first form line by driving across field 32 (or at least over that portion of field 32 that is to be sprayed), e.g., following a fence line, a crop boundary line or a natural contour in the land, at step 106. This process finishes at step 108 when the first form line path has been completed. During this process, GPS data is collected at a variety of geographic locations at step 110. Then, at step 112, the GPS data collection ends when the first form line has been completed.

FIG. 3 illustrates the process of data collection during the definition of the first form line in more detail. Notice that as sprayer rig 30 is driven across field 32, the form line following apparatus is activated and GPS data is collected at a number of points 200, 204, 206, 208, 210, etc. The distance between these GPS data collection points is variable, and will typically correspond to submeter distances. The GPS data collected at each point is processed along with the differential GPS information (or RTK corrections) and a series of terrestrial positions are computed. These positions (when linked together, e.g., by a straight or curved line approximation) will define the first form line—that is, the path followed by sprayer rig 30 as it maneuvered across field 32. In this way, GPS receiver 60, or a separate processor, computes a first form -line which corresponds to the actual path traveled by sprayer rig 30.

Returning to FIG. 5, if additional form lines are to be sprayed, a decision made at step 114, GPS receiver 60 (or the separate processor) computes a new form line (or swath) to be followed, based on the GPS data collected while sprayer rig 30 traversed across the first form line path. An offset due to, for example, the effective spraying width of boom assembly 34 is also taken into account so that portions of field 32 are not sprayed a second time. The computed new form line may be used to generate guidance information for the operator of sprayer rig 30. For example, as the operator turns sprayer rig 30 around to follow a return path across field 32, the actual position of sprayer rig 30 (as determined by new GPS position information received by GPS receiver 60) is compared with its expected position (i.e., the second form line information computed as described above). If the actual position agrees with the expected position, the operator is so advised, e.g., by the illumination of LED 74 in light bar 72. This continues as sprayer rig 30 is driven back across field 32 with new GPS data being constantly collected and the actual position of sprayer rig 30 being constantly checked against its expected position. As deviations from the expected positions are noted, display information is provided to the operator to allow guidance corrections as discussed above.

This process is further illustrated in FIG. 5 where, at step 118, the operator begins the next form line. In general, the operator follows the guidance information computed by GPS receiver 60 and displayed on moving map display 64 and heading indicator 70 and also on light bar 72. During this time, the operator may input corrections for obstacle avoidance or terrain features using steering wheel 80 or another steering control. Ultimately, the operator will finish the second form line at step 122.

During the process of following the guidance information provided by GPS receiver 60, new GPS data is collected at step 124. The new GPS data will be used to provide guidance information as described above and will also form the basis for computing any subsequent form line as was the case where the GPS data collected while following first form line was used to compute the second form line. GPS data collection for the second form line ends at step 126. Notice that the subsequent form line is computed based on the actual path traveled by sprayer rig 30 and not just the expected path computed after the first form line was completed. Thus, any deviations of sprayer rig 30 from the computed second form line, which were required due to the presence of rocks, trees, etc., will be reflected in the new GPS data and the subsequent form line will take into account these corrections.

If a subsequent form line is to be sprayed, a decision made at step 128, guidance information for that form line is computed at step 130, with offset information being applied as before. These processes continue until the spraying operations for field 32 are completed at step 132 at which time the form line following process 100 quits at step 134. Notice that a decision process at step 132 allows an operator to indicate that a current set of form lines have been completed but that the complete set of operations for the field have not been completed. This situation may arise, for example, where different crops are situated in the same field or where a new chemical is being applied. In such cases, the operator may indicate that a new set of form lines (corresponding to the new conditions) should be initiated, beginning at step 102.

In some cases, form line following process 100 may be configured so that only deviations greater than a specified distance from an intended track are recognized. That is, only significant deviations from a computed form line guidance path (e.g., the second form line discussed above) will be used as decision points for displaying guidance correction information to the user. To illustrate, consider the situation illustrated in FIG. 6. As shown, a sprayer rig operating in a field 150 was supplied with guidance information (e.g., using the above described form line following process 100) that would have the sprayer rig follow an intended path 152. However, while traversing field 150, the sprayer rig actually followed a path 154. Path 154 is somewhat different than the intended path 152 and includes a deviation 156 around obstacle 158.

It will be appreciated that, in accordance with form line following process 100, GPS data is collected while the sprayer rig is traversing path 154. Therefore, GPS receiver 60 may perform numerous computations that indicate that the sprayer rig is not following the intended form line path 152. However, where these deviations are not significant, it would be burdensome, both in terms of computation operations and in terms of operator fatigue, to constantly display guidance correction information to the user. In other words, if guidance correction information (e.g., illumination of various LEDs of light bar 72) were constantly displayed to the user even when the deviations of the sprayer rig from a intended path were not significant, a user would soon grow weary of constantly having to steer the sprayer rig left and right to correct these minor deviations.

Accordingly, form line following process 100 may be configured so that deviations which are not significant are "ignored". That is, when GPS receiver 60 recognizes that the sprayer rig has only deviated from the intended form line path by a distance less than a specified distance, no new guidance information is displayed (e.g., LED 74 will be lit as if the sprayer rig was still on the intended path). Then, when a significant deviation, such as deviation 156, is recognized, appropriate guidance information which will allow the operator to regain the intended path will be displayed.

Figure 6:
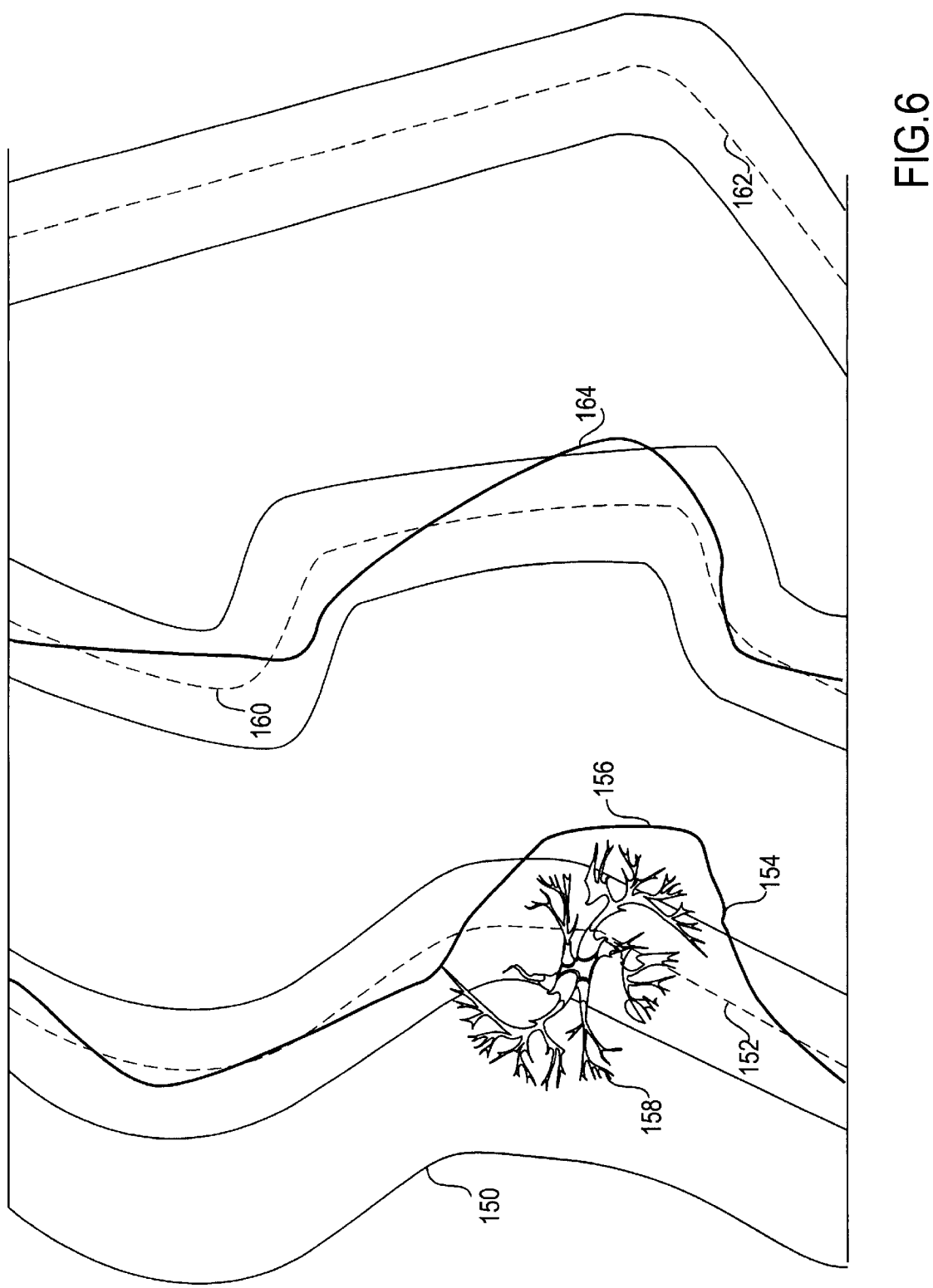
FIG. 6 illustrates the process of computing new form lines when deviations from a projected form line path of at least a specified distance are recognized.

As illustrated in FIG. 6, the predefined distance which will trigger the display of guidance information essentially "broadens" the width of the intended form line path 152 to a "lane". The lane width may be user configurable and will typically correspond to a few feet, depending on field conditions. As significant deviations are recognized, appropriate guidance information is displayed. The guidance information may be displayed before the operator veers outside of a lane so that excessive "zig-zagging" will be avoided. Thus, the risk of producing cumulative errors over several form lines is reduced and the intended paths of the sprayer rig through the field remain relatively straight. These factors all contribute towards reducing the operator's steering burden and operator fatigue.

Notice also in FIG. 6 that the next intended form line 160 is computed based on the actual path 156 traversed by the sprayer rig. Thus, the deviation around obstacle 158 is accounted for. Likewise, the third intended form line path 162 will be computed based on the actual path 164 driven by the sprayer rig.

Figure 7:
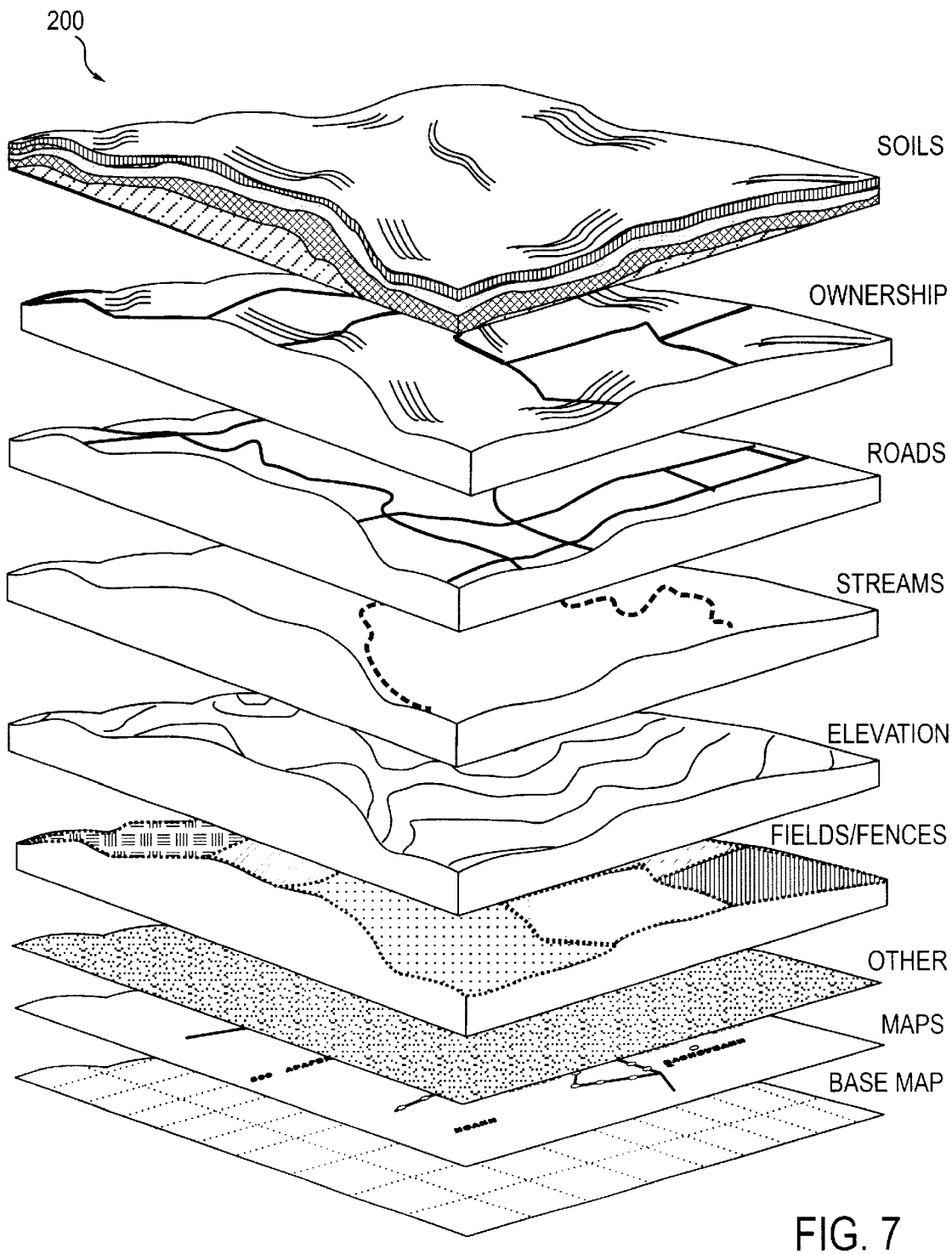
FIG. 7 illustrates various data layers in a geographic information structure.

As indicated above, form line following information may also be provided by an external source. FIG. 7 shows illustrative data layers which may be provided in a geographic information system (GIS). A GIS is a system of hardware, software and geographic data designed to support the capture, management, manipulation, analysis, modeling and display of spatially referenced data for solving complex planning and management problems. The main propose of a GIS can be to find solutions to problems by using both geographic and tabular data. For the example shown, GIS 200 (which may exist inside a computer system) includes information relating to various soils, ownership (e.g., fence lines), roads, streams, elevation, fields, and other data, all of which may be overlaid on a base map of field 32. The spraying information provided by GPS receiver 60 in the course of computing various form lines may also be provided as a layer in GIS 200. In this way, a user will have information regarding the application. of the various chemicals at points of interest on field 32. This may assist a farmer in various precision agricultural operations by comparing which spray formulas achieved better crop yields. Alternatively, the form line information from previous spraying operations may be downloaded for use in new spraying operations by providing guidance information as described above.

Up to this point it has been assumed that the field in which the sprayer rig operates is relatively flat. However, in those situations where the sprayer rig will operate over sloping terrain, certain corrections must be accounted for. In particular, it will be appreciated that when the sprayer rig is operating on a hillside or other sloping terrain, the boom assembly 34 will have an effectively shorter horizontal spraying (or swath) width than it would have when the sprayer rig operates on essentially flat terrain. Indeed, the effective horizontal spraying width of the boom assembly 34 may be approximately equal to the physical length of the boom assembly multiplied by the cosine- of the angle of the slope of the terrain (assuming the spraying nozzles do not direct chemicals significantly beyond the ends of the boom assembly 34). That is, effective horizontal swath width=physical swath width·cos Ø,
where Ø=slope of the terrain.

Figure 8A:
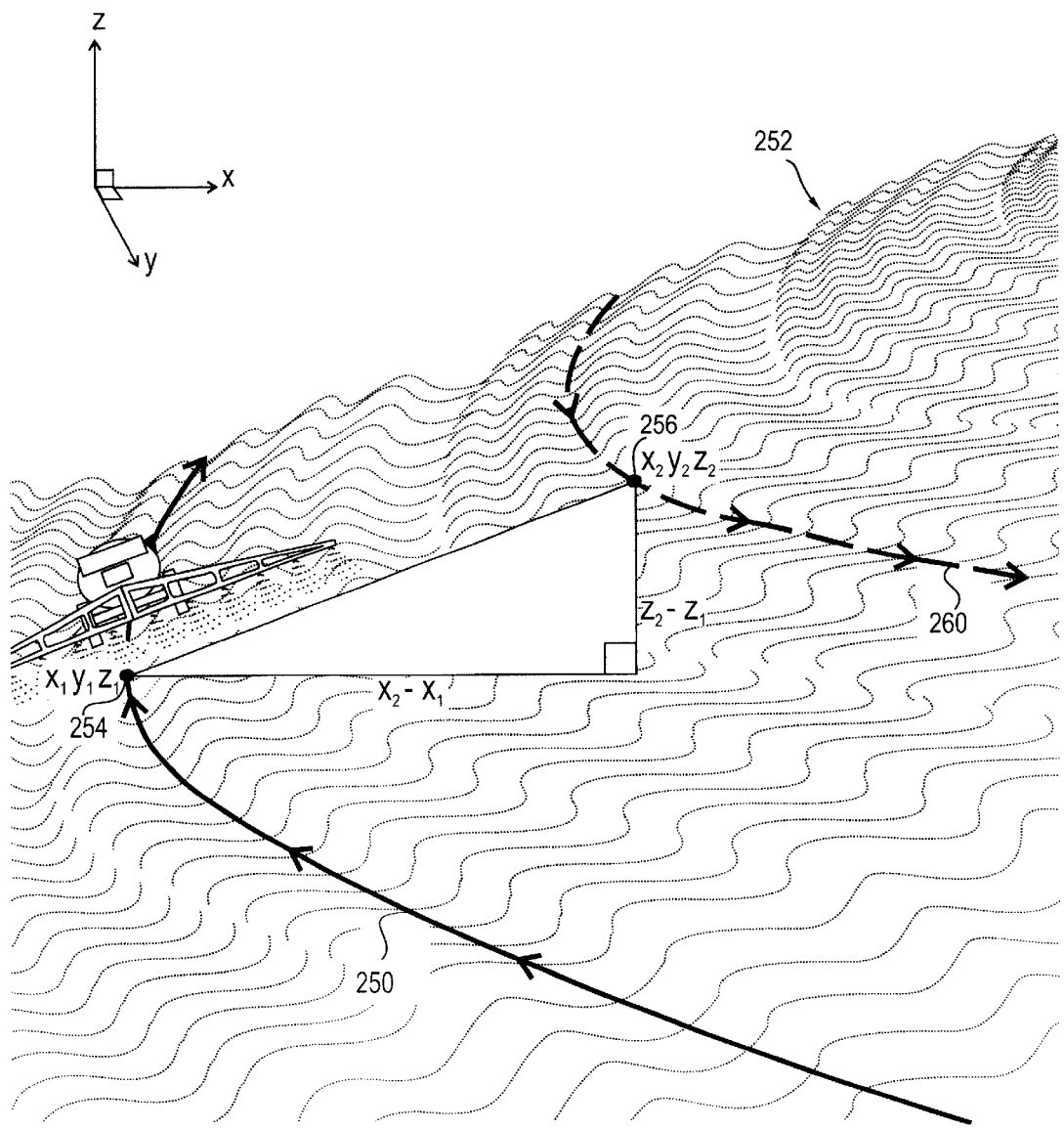
FIG. 8A illustrates spraying operations on sloping terrain and the appropriate corrections required therefore according to one embodiment of the present invention.

This situation is illustrated in FIG. 8A which shows a first form line path 250 over a hillside 252. During spraying operations, a sprayer rig traveled along the first form line 250 and reached a position 254 defined by coordinates $x_1$, $y_1$, $z_1$. Now on the return path, the sprayer rig needs to be guided to a position 256 which is offset from position 254 by the effective spraying swath distance. Position 256 is defined by coordinates $x_2$, $y_2$, $z_2$ and, assuming that $y_1 \cong y_2$, then $$x_2 \simeq swath\ distance \cdot \cos\left[\tan^{-1}\left(\frac{z_2 - z_1}{x_2 - x_1}\right)\right].$$

GPS receiver 60 will have computed $x_1$ and $z_1$ while the sprayer rig was traveling along form line 250. Further, positions $x_2$ and $z_2$ will be computed from GPS data received while the sprayer rig is traveling along the second form line 260. It will be appreciated that by the time the sprayer rig reaches position 256 and computes $x_2$ and $z_2$, the sprayer rig will have already passed position 256. Thus, the guidance information will be late. However, because GPS receiver 60 computes new positioning data several times each second, the distance traveled by the sprayer rig will be insignificant. In addition, guidance smoothing and predictive filters (e.g., Kalman filters) can be employed to reduce the effects of this lag time between the receipt of new GPS data and the calculation of guidance information.

Figure 8B:
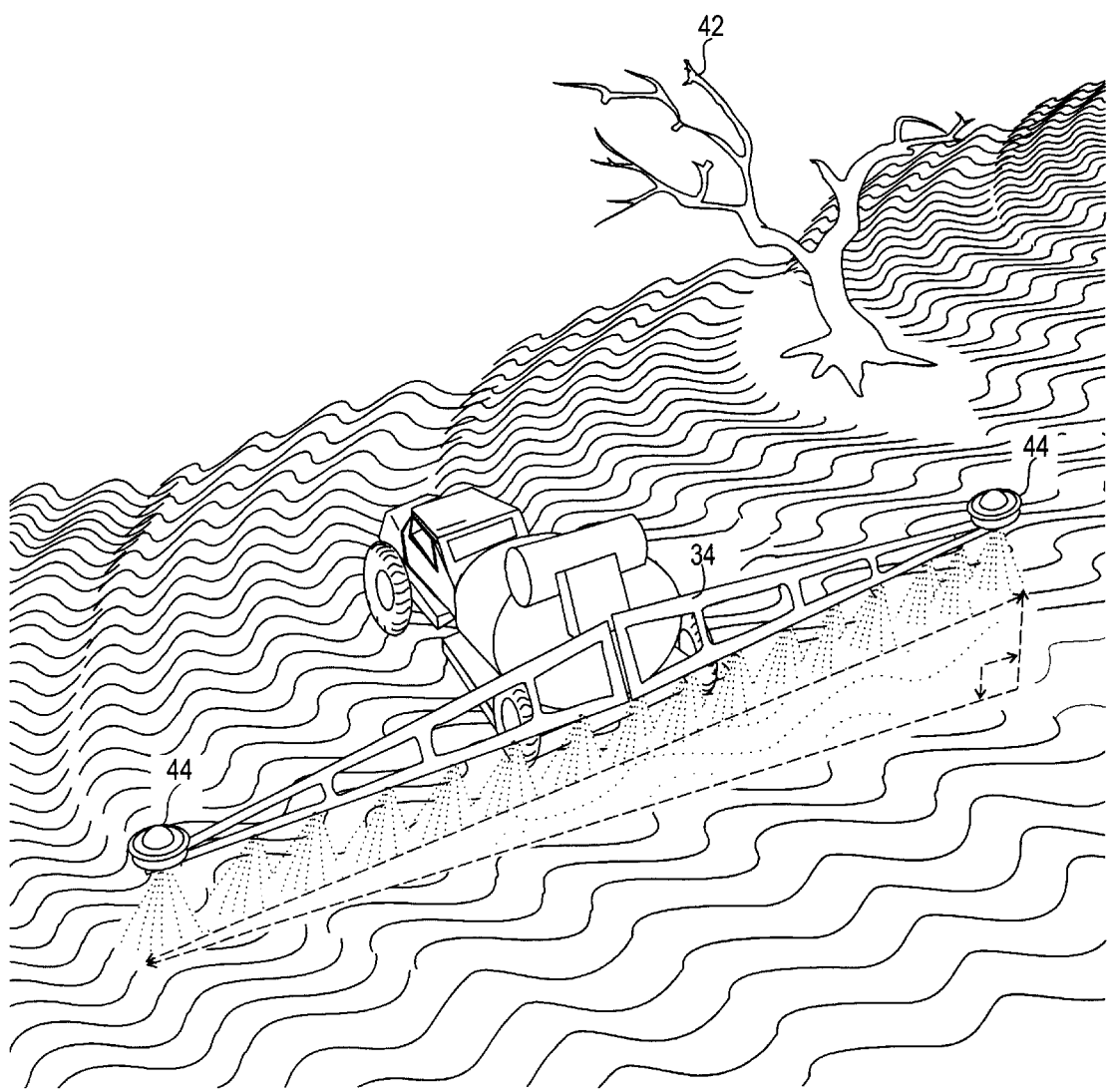
FIG. 8B illustrates an alternative embodiment of the present invention for use on sloping terrain.

In alternative embodiments, such as that illustrated in FIG. 8B, sprayer rig 30 may be equipped with GPS antennas 44 at either end of boom assembly 34. This would allow GPS receiver 60 to compute the elevations of each end of the boom assembly 34 (provided DGPS or RTK corrections are used) and thereby derive the slope of the terrain (i.e., the angle Ø). This information could then be used to compute the effective horizontal swath width as described above, eliminating the need for guidance and predictive filters as may be required in a single antenna situation. This concept may be expanded to equip sprayer rig 30 with three antennas, two on boom assembly 34 and one positioned (for example) on the cab, to allow the computation of three elevation parameters. This may be useful for undulating terrain where not only horizontal slope (i.e., roll), but also longitudinal slope (i.e., pitch) must be accounted for.

A further embodiment may equip sprayer rig 30 as described in U.S. Pat. No. 5,268,695 to Dentinger et al. (the "'695 patent"), assigned to the Assignee of the present invention., The '695 patent describes methods and apparatus for differential phase measurement through antenna multiplexing and the entire disclosure is incorporated herein by reference. In one embodiment, multiple GPS antennas are connected to a GPS receiver so that a carrier signal received by the antennas is time multiplexed through a single hardware path to the receiver where a reference oscillator is used to compare the phase of the signal from each antenna to the phase of a reference signal. One of the antennas is designated as the reference antenna and the carrier signal received by the reference antenna is used to phase lock the reference signal generated by the reference oscillator. The phase of the same carrier signal received by the other antennas is periodically compared to the phase of the reference signal and each comparison results in a single phase angle measurement for the respective antennas compared to the reference antenna The computed phase angle measurements allow for the calculation of the angle of inclination of a plane in which the multiple antennas are situated. Thus, using such a system, the angle of inclination of the boom assembly 34 could be computed and, hence, the effective horizontal swath distance derived.

Figure 9:
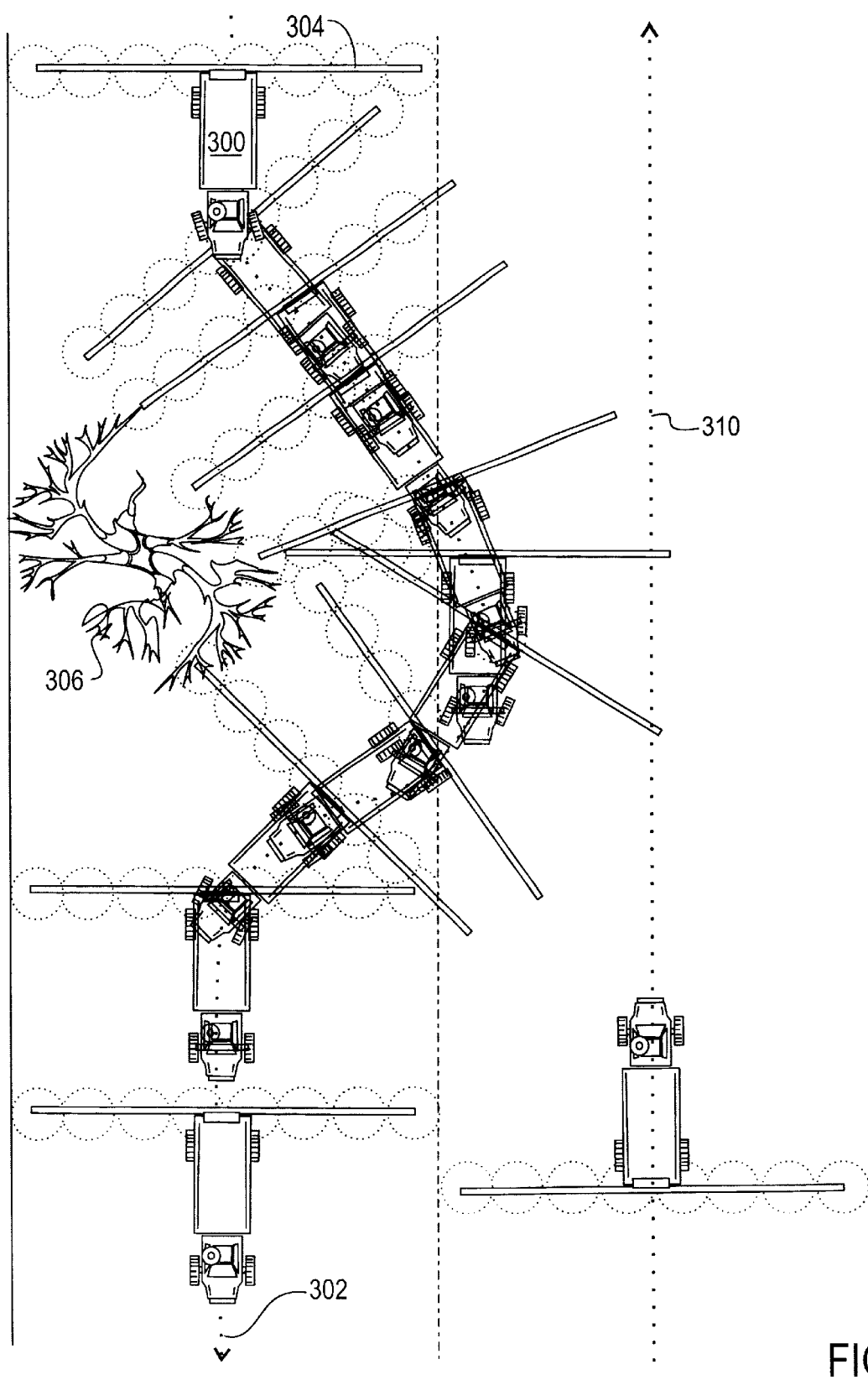
FIG. 9 illustrates an alternative method of sprayer rig operations to account for obstacle avoidance in accordance with a further embodiment of the present invention.

An alternative to the form line following process 100 is illustrated in FIG. 9. Sprayer rig 300 is operating in a field and will proceed along essentially parallel form lines 302, 310, etc. These form lines may be precomputed and will not take into account operator-inputted deviations. To avoid over application of chemicals, however, the nozzles of boom assembly 304 will be controlled so that the obstacles (and the resulting deviations of sprayer rig 300) are accounted for.

To illustrate, consider that as sprayer rig 300 travels along form line 302, eight nozzles of boom assembly 304 are operating and, thus, chemicals are being applied over a swath path equal to the width of boom assembly 304 and centered on form line 302. As sprayer rig 300 maneuvers around obstacle 306, a form line following apparatus similar to that described above recognizes that portions of boom assembly 304 are now positioned over areas of the field to be sprayed when sprayer rig 300 is traveling along form line 310. That is, portions of boom assembly 304 are encroaching on a swath path to be covered during another pass on a different form line. Accordingly, the form line following apparatus will shut off those nozzles which are positioned outside the swath path associated with form line 302 and, thus, this area will not be sprayed with chemicals. Instead, the area will be sprayed when sprayer rig 300 travels along form line 310.

This operation achieves the same result as form line following process 100 and also accounts for the deviations around obstacle 306. An alternative approach would be to turn off the appropriate nozzles when sprayer rig 300 travels along form line 310 (assuming all nozzles were operating when the swath associated with form line 302 was being sprayed). Other approaches utilizing collapsible boom assemblies 34 may also be used.

To accommodate a process such as that illustrated in FIG. 9, sprayer rig 300 is fitted with a form line following apparatus similar to that described above and a nozzle control device is provided such that nozzle control commands from GPS receiver 60 will control the application of chemicals.

In addition to allowing a human operator to steer a spraying rig along intended paths, the present invention may be adapted for use with semi-autonomous or fully autonomous vehicles which provide some level of robotic control. Ground vehicles which make use of GPS technology to provide navigation information are now being developed. For example, RAHCO International has developed a track mounted, unmanned ground vehicle for hazardous waste transport. A description of the vehicle and its navigation and obstacle avoidance system is provided in a paper by Raymond C. Daigh, entitled "High Reliability Navigation for Autonomous Vehicles" delivered and published as part of the 1996 Trimble Surveying & Mapping User's Conference User Application Papers. This entire disclosure is incorporated herein by reference. Briefly, the vehicle incorporates a dead reckoning system which includes a rate gyro, an electronic compass and track encoders (the vehicle uses tracks instead of wheels) along with a differential GPS positioning system. This system allows for real time positioning and navigation at moderate speeds. Those skilled in the art will appreciate that systems employing more sophisticated RTK systems (which provide centimeter level accuracy and low latency updates) may allow for operations at higher speeds.

In addition to the above-described navigation system, the vehicle developed by RAHCO International includes a collision avoidance system. The collision avoidance system includes an array of ultrasonic sensors mounted on each end of the vehicle and arranged to provide overlapping coverage. Although not discussed by Mr. Daigh, other sensors such as radar, laser range finding equipment and robotic vision systems could also be used for such a collision avoidance system.

Those skilled in the art will recognize, in light of the above disclosure, that a robotic vehicle such as that described by Mr. Daigh could be enhanced by incorporating a form line following system similar to the present invention. In general, such an autonomous vehicle would be provided with a navigation and collision avoidance system such as that developed by RAHCO International and would also include the form line following methods and apparatus of the present invention. The vehicle navigation system would be provided with form line following information as described above which, in conjunction with the inertial navigation and DGPS equipment could be used to guide the vehicle in a field or other environment. Obstacles detected by the collision avoidance system would be steered around (by the use of steering output commands provided by the steering avoidance system and new GPS data would be collected during these deviations. This new GPS data would be used to compute updated form lines as described above and this information could be provided as steering inputs to the vehicle's navigation system. Of course, in some cases the features of a fully autonomous vehicle could be combined with the guidance equipment (e.g., a multi-function light bar) associated with human operator controlled equipment to provide a semi-autonomous vehicle.

Thus, a form line following guidance system has been described. Although described with reference to specifically illustrated embodiments, the present invention has application to a variety of other guidance system. Accordingly, the present invention should be limited only by the claims which follow.

What is claimed is:

1. A method, comprising computing, during a spraying operation, an effective horizontal swath width of a sprayer rig using position and three-dimensional terrain shape information derived from or computed by a Global Positioning System (GPS) receiver.

2. The method of claim 1 wherein the position information is obtained during successive form line following operations.

3. The method of claim 2 wherein the sprayer rig is equipped with more than one GPS antenna for the GPS receiver.

4. The method of claim 1 wherein the effective horizontal swath width is computed so as to account for maneuvering of the spraying rig around one or more obstacles.

5. The method of claim 1 further comprising operating spray nozzles of the sprayer rig according to the position information.

6. The method of claim 5 wherein the spray nozzles are operated so as to account for maneuvering of the sprayer rig around one or more obstacles.

7. The method of claim 6 wherein the spray nozzles are further operated so as to account for variations in the elevation of the terrain over which the sprayer rig is traveling.

8. The method of claim 7 wherein the sprayer rig is operated so as to follow form lines computed according to the position information.

9. The method of claim 8 wherein the form lines are computed so as to account for the maneuvering of the sprayer rig.

* * * * *